United States Patent [19]
Kise et al.

[11] Patent Number: 5,828,816
[45] Date of Patent: Oct. 27, 1998

[54] IMAGE PROCESSING APPARATUS AND IMAGE PROCESSING METHOD

[75] Inventors: Takashi Kise; Takatoshi Ohta; Nobuo Ohnuma, all of Yokohama, Japan

[73] Assignee: Canon Kabushiki Kaisha, Tokyo, Japan

[21] Appl. No.: 688,275

[22] Filed: Jul. 29, 1996

[30] Foreign Application Priority Data

Jul. 31, 1995 [JP] Japan ..................................... 7-194982

[51] Int. Cl.$^6$ .............................. G06F 15/00; H04N 1/46; G03F 3/08
[52] U.S. Cl. ........................ 395/109; 395/114; 358/500; 358/517; 358/518; 358/519; 358/521
[58] Field of Search ..................................... 358/500, 512, 358/515, 517, 518, 519, 521, 530, 523; 348/645, 649; 395/109, 106, 112, 114

[56] References Cited

U.S. PATENT DOCUMENTS

| | | | |
|---|---|---|---|
| 5,060,060 | 10/1991 | Udagawa et al. | 358/80 |
| 5,243,414 | 9/1993 | Dalrymple et al. | 358/500 |
| 5,268,753 | 12/1993 | Yamaguchi | 358/527 |
| 5,315,381 | 5/1994 | Yamashita et al. | 358/500 |
| 5,539,540 | 7/1996 | Spaulding et al. | 358/518 |

FOREIGN PATENT DOCUMENTS

| | | | |
|---|---|---|---|
| 0660589 | 6/1985 | European Pat. Off. | H04N 1/56 |
| 0325395 | 7/1989 | European Pat. Off. | H04N 1/46 |
| 0409474 | 1/1991 | European Pat. Off. | H04N 1/46 |
| 0675639 | 10/1995 | European Pat. Off. | H04N 1/60 |
| 0680199 | 11/1995 | European Pat. Off. | H04N 1/60 |
| 61-293089 | 12/1986 | Japan | H04N 9/28 |

*Primary Examiner*—Edward L. Coles
*Assistant Examiner*—Mark E. Wallerson
*Attorney, Agent, or Firm*—Fitzpatrick, Cella, Harper & Scinto

[57] ABSTRACT

An image processor which improves the reproducibility of the color blue, includes an input device which inputs color image data, and a color correction device which performs color correction of the input color image data based on color correction parameters. An output device outputs the color corrected input image data to an image forming device that forms an image by using recording materials corresponding to a plurality of colors including magenta and cyan. The color correction device decreases the amount of magenta used for image formation, and uses the color correction parameters to suppress the elimination of gradation in a color zone formed by cyan.

9 Claims, 6 Drawing Sheets

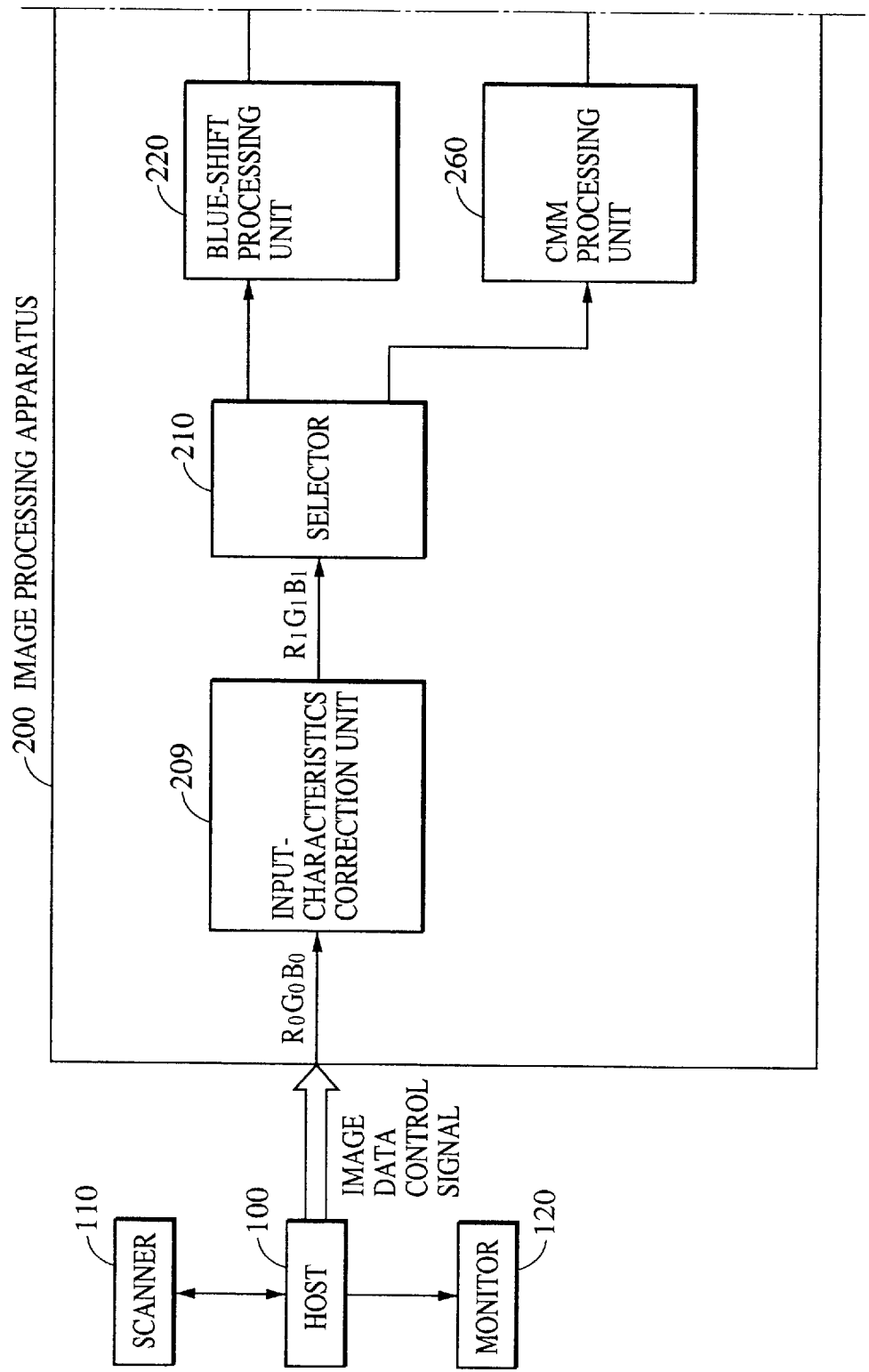

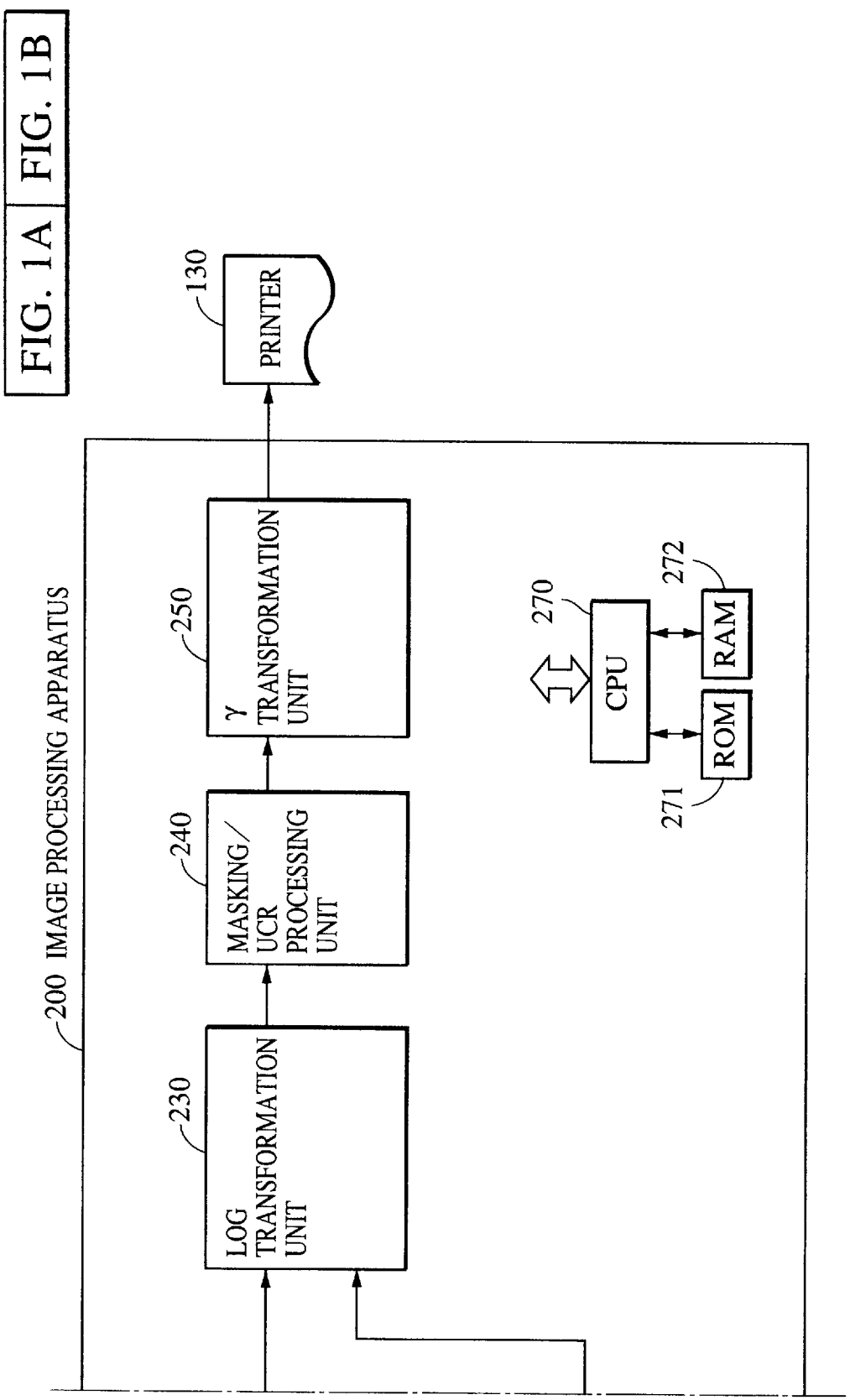

FIG. 4

| SETTING OF IMAGE PROCESSING | | |
|---|---|---|
| CMM | YES | NO |

IMAGE PROCESSING APPARATUS AND IMAGE PROCESSING METHOD

BACKGROUND OF THE INVENTION

1. Field of the Invention

The present invention relates to an image processing apparatus for performing color correction. The invention also relates to an image processing method used in the above apparatus.

2. Description of the Related Art

In a color printer that inputs Red, Green and Blue (RGB) signals, Cyan, Magenta and Yellow (CMY) signals, which colors are complementary colors of RGB, or Cyan (C), Magenta (M), Yellow (Y), and Black (K) signals, and performs printing according to the input signal by use of ink or toner in a CMY or CMYK color, a 100%-density cyan (C) component and a 100%-density magenta (M) component are overlapped to print a blue color. Similarly, for printing the other primary colors, such as red and green, a 100%-density C component, a 100%-density M and a 100%-density Y component are overlapped.

However, the above-described known technique presents the following problem. The CMY printing materials for use in the printer are not perfectly complementary colors of RGB, thereby disadvantageously presenting a purplish blue color.

SUMMARY OF THE INVENTION

Accordingly, in view of the above background, it is an object of the present invention to provide improved reproducibility of a blue color.

It is another object of the present invention to provide improved color processing to achieve good reproducibility of colors suitable for the user's purpose.

In order to achieve the above objects, according to one aspect of the present invention, there is provided an image processing apparatus including: input means for inputting image data; setting means for setting a desired color processing mode selected from a plurality of color processing modes; and color processing means for executing color processing according to the color processing mode set by the setting means, wherein the plurality of color processing modes include a first color-processing mode in which color-space compression processing is performed, and a second color-processing mode in which the color-space processing mode is not performed, the second color-processing mode comprising blue-shift processing for reproducing a blue color based on the characteristics of a printing material used in an image output device.

According to another aspect of the present invention, there is provided an image processing apparatus including: input means for inputting image data; color correction means for making color corrections to the image data with use of color correction parameters; and output means for outputting the image data subjected to the color correction performed by the color correction means to image forming means that forms an image by use of recording materials corresponding to a plurality of colors including magenta and cyan, wherein the color correction means decreases the amount of magenta used for image formation and also uses the color correction parameters such that the elimination of gradations in a color zone to be formed by a recording material corresponding to cyan is suppressed.

Further objects, features and advantages of the present invention will become apparent from the following description of the preferred embodiments with reference to the attached drawings.

BRIEF DESCRIPTION OF THE DRAWINGS

FIGS. 1A and 1B when taken together as shown in FIG. 1 is a block diagram of an image processing system;

FIG. 4 illustrates a display example of the mode setting screen; and

DETAILED DESCRIPTION OF THE PREFERRED EMBODIMENT

Figure 2:
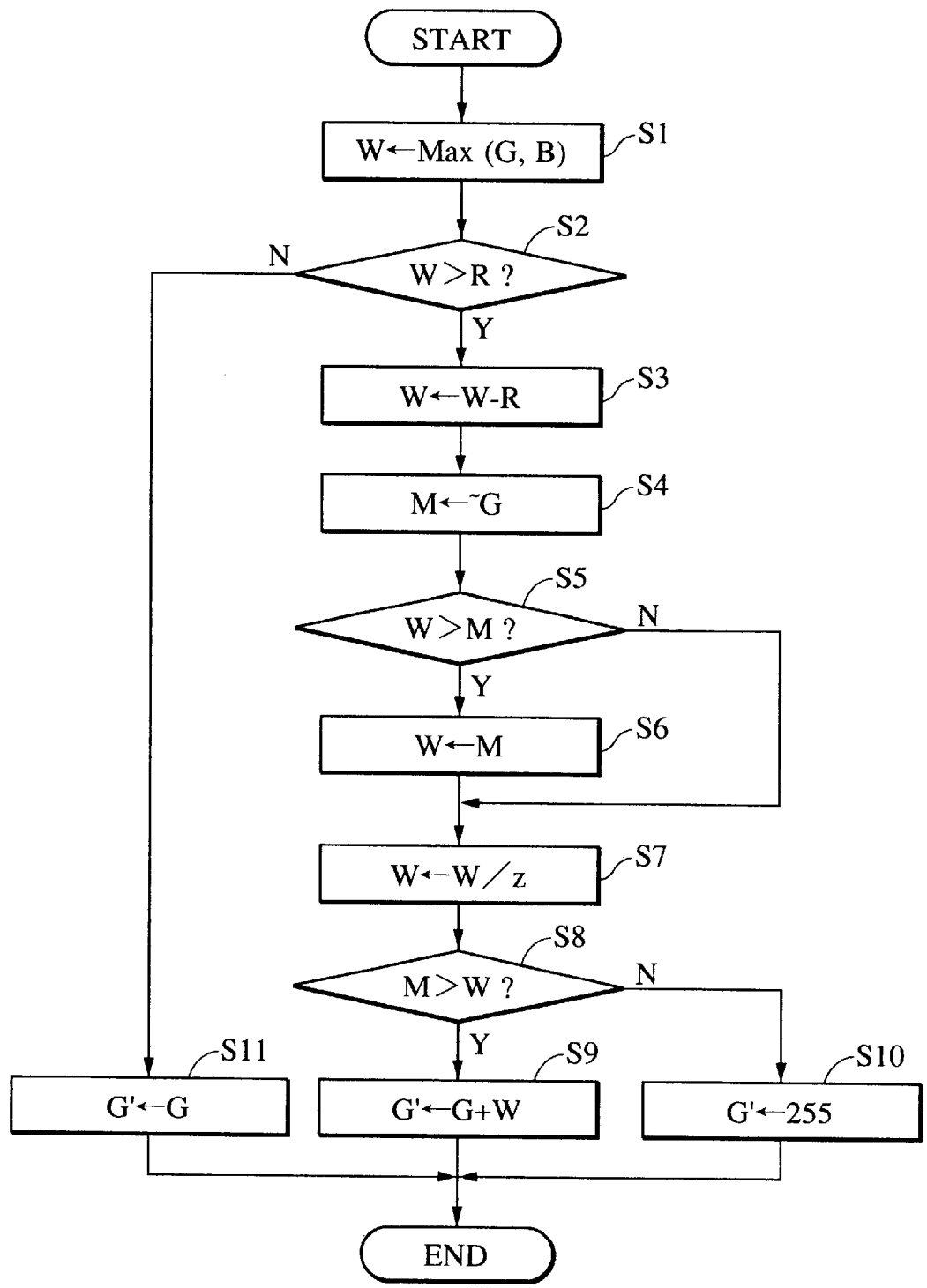
FIG. 2 is a flow chart of an example of blue-shift processing.

As discussed in the Description of the Related Art, when a blue color (R,G,B)=(0,0,255) is output from a printer using three (four) colors CMY (K) of inks at a density of C:100%, M:100%, and Y:0%, the CMY inks exhibit a purplish blue since the CMY colors are not perfectly complementary colors of RGB. One of the ways to solve this problem is a blue-shift processing method which can be expressed by the following equation (1) in which CMY (K) is linearly transformed into C'M'Y' (K') for decreasing the amount of magenta (M) ink for producing a blue color.

$$\begin{pmatrix} C' \\ M' \\ Y' \\ K' \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} C \\ M \\ Y \\ K \end{pmatrix} \quad (1)$$

This method is employed under the condition that the transformed values smaller than 0 are substituted by 0 and the transformed values greater than 255 are substituted by 255 so that the resulting values can range from 0 to 255.

Even in this method, however, there is still room for improvement in which gradations around Cyan (C) are lost when blue is shifted toward C. For example, the transformation expressed by the following equation (2) by use of a matrix will be performed (0<x<1):

$$\begin{pmatrix} C' \\ M' \\ Y' \\ K' \end{pmatrix} = \begin{pmatrix} 1 & 0 & 0 & 0 \\ -x & 1 & 0 & x \\ 0 & 0 & 1 & 0 \\ 0 & 0 & 0 & 1 \end{pmatrix} \begin{pmatrix} C \\ M \\ Y \\ K \end{pmatrix} \quad (2)$$

When C, Y and K are fixed (C=255, Y=0, K=0), and M is varied in a range of 0≦M≦255*x, (C',M',Y',K') results in (255, 0, 0, 0) (the negative values are substituted by 0), which is the same color as a 100%-C color. Color gradations around C are thus eliminated. This method is suitable for processing images with a smaller number of colors, such as graphs and the like. In graphs, the distinction in the color differences is more important rather than the expression of color gradations. Even though the gradations are eliminated, the number of colors is unchangeable. However, this method is not suitable for images with a larger number of colors, such as natural images, because the expression of color gradations are of more importance.

In order to overcome the above drawback, in the below-described embodiment, color gradations around C are maintained, while achieving good reproducibility of a blue color.

Only the value M is varied in equation (2), which can be expressed by the following equation:

$$M'=M-(C-K)*x \quad (3)$$

where x is a correction coefficient (0<x<1). The absence of gradations around C can be overcome by gradually changing the value M' when the values C, Y and K are fixed (C=255, Y=0, K=0), and when the value M is varied in a range of $0 \leq M \leq 255*x$. M' obtained by the following equation (4) is determined to be the value after a correction is made:

$$M'=M-MIN(C-K,M)*x \quad (4)$$

where K indicates MIN(C,M,Y); MIN is a function of the minimum value; and x is a correction coefficient. When transformation is performed on the color (C=255, $0 \leq M \leq 255*x$, Y=0, K=0) according to this equation (4), the transformation equation is turned to be M'=M−M*x, i.e., M'=M*(1−x), since C−K>M. As a result, gradations are compressed but not eliminated. In other words, the gradation elimination is inhibited.

Figure 4:
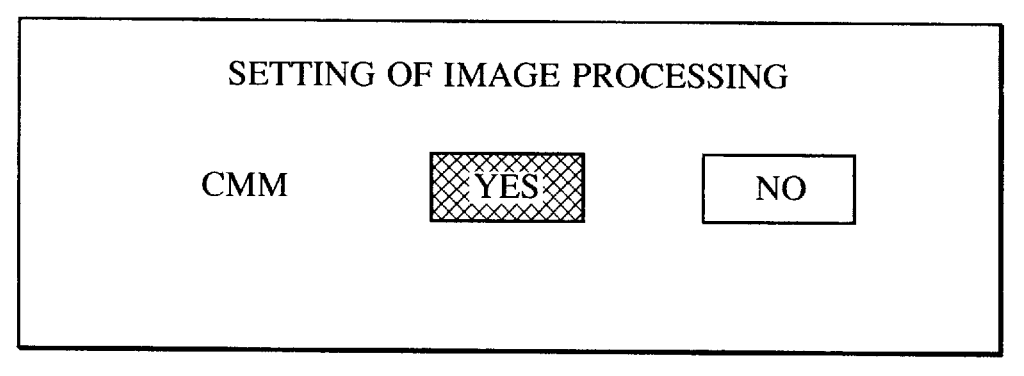

A suitable embodiment of the present invention by application of the above-described blue-shift processing will now be described with reference to the drawings. FIGS. 1A and 1B when taken together as shown in FIG. 1 is a block diagram of an image processing system according to this embodiment. The image processing system includes a host 100 for generating image data representing a desired image, a scanner 110 and a monitor 120 connected to the host 100, an image processing apparatus 200, and a printer 130. The host 100 inputs image data obtained by reading a document, for example, with the scanner 110, and displays the read image data on the monitor 120. At the same time, the host 100 performs editing with the use of an application on the host 100 so as to generate image data representing a desired image and to output the edited image data to the image processing apparatus 200. Further, the host 100 causes the monitor 120 to display, as shown in FIG. 4, an instruction to set the image processing mode on the monitor 120, and outputs, together with the above-mentioned image data, a control signal indicating a mode specified by the user through an operational unit (not shown).

The image processing apparatus 200 executes color processing on the image data according to the mode indicated by the control signal. A CPU 270 controls the individual elements using a RAM 272 as a work memory based on a program stored in a ROM 271. For example, the CPU 270 analyzes a control signal indicating the mode input from the host 100 so as to control a selector 210.

An input-characteristics correction unit 209 corrects the distortion of $R_0G_0B_0$ image data which is input from the host 100 and is dependent on the monitor characteristics of the monitor 120, and outputs the resulting $R_1G_1B_1$ image data to the selector 210. The selector 210 outputs the $R_1G_1B_1$ image data to a color matching method (CMM) processing unit 260 if the CMM mode is specified by the user. On the other hand, if the CMM mode is not designated by the user, the selector 210 outputs the $R_1G_1B_1$ image data to a blue-shift processing unit 220. Then, the blue-shift processing unit 220 performs blue-shift processing on the $R_1G_1B_1$ image data according to a computation operation in order to achieve good reproducibility of a blue color. On the other hand, the CMM processing unit 260 executes CMM processing on the $R_1G_1B_1$ image data, while referring to a look-up table (LUT) corresponding to the CMM.

A logarithm (LOG) transformation unit 230 performs luminance-to-density conversion. A masking/under color removal (UCR) processing unit 240 performs mask processing by use of a coefficient based on the characteristics of the ink used in the printer 130, and also executes UCR and black-generation processing. The CMYK image data is thus generated. A γ transformation unit 250 makes gradation corrections to the respective CMYK colors based on the output characteristics of the printer 130. Then, the printer 130 forms an image on a printing medium based on the CMYK image data processed in the image processing apparatus 200. The blue-shift processing and the CMM processing will now be explained in greater detail below.

(Blue-Shift Processing)

FIG. 2 is a flow chart of the blue-shift processing (blue-color correction) in which RGB is transformed into RG'B by the blue-shift processing unit 220. When M in the equation (4) is substituted by G, which is a complementary color of M, the resulting equation can be expressed by:

$$G'=G+MIN(W-R,255-G)*x \quad (5)$$

where W=MAX(R,G,B); MAX is a function of the maximum value; and x is a correction coefficient. The variable used in this embodiment is a byte type representing the number from 0 to 255, and such numbers are adapted not to overflow. Further, the above-described correction coefficient x=1/z is implemented by dividing integers rather than by multiplying decimals.

The blue-shift processing is executed by the following procedure. The greater value, G or B, is set as an operation variable W (S1). If W is greater than R (S2), the flow proceeds to S3, and if not, the flow proceeds to S11. In S3, R is subtracted from W, and the resulting value is set as W. The G's complement is set as M (S4). If W is greater than M (S5), the flow proceeds to S6, and if not, the flow proceeds to S7. In S6, the value M is set as W. The value W is divided by z (S7). If M is greater than W (S8), the flow proceeds to S9 in which G is added to W, and the resulting value is set as G'. If it is determined in S8 that M is not greater than W, the flow proceeds to S10 in which 255 is set as G'. If it is determined in S2 that W is not greater than R, the flow proceeds to S11 in which G is set as G'. After any of the above three steps (S9, S10 and S11), the process is ended. According to the above-described procedure, blue-shift processing is not performed on the zone in which W−R=0, i.e., the zone in which R=MAX(R,G,B). In other words, this processing method offers the advantage of attaining good reproducibility of a blue color while producing little influence on the other colors. Additionally, the increased amount of G makes it possible to decrease the amount of M used for image formation, thereby preventing a blue color from becoming purplish. Moreover, the decreased amount of M for a blue color makes it possible to improve blue color reproducibility and also to suppress the elimination of G gradations, so that the gradations around C can be maintained.

(CMM Processing)

Figure 3:
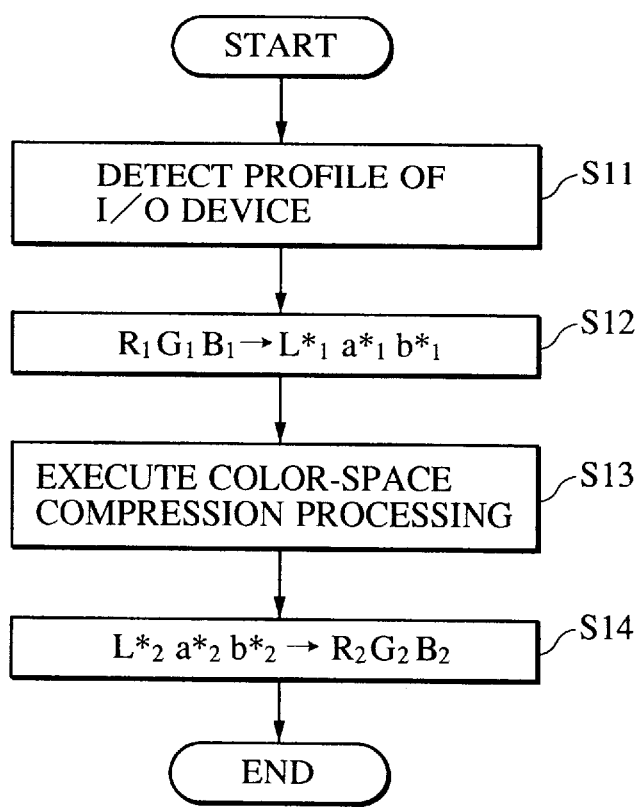
FIG. 3 is a flow chart of an example of CMM processing.
Figure 5:
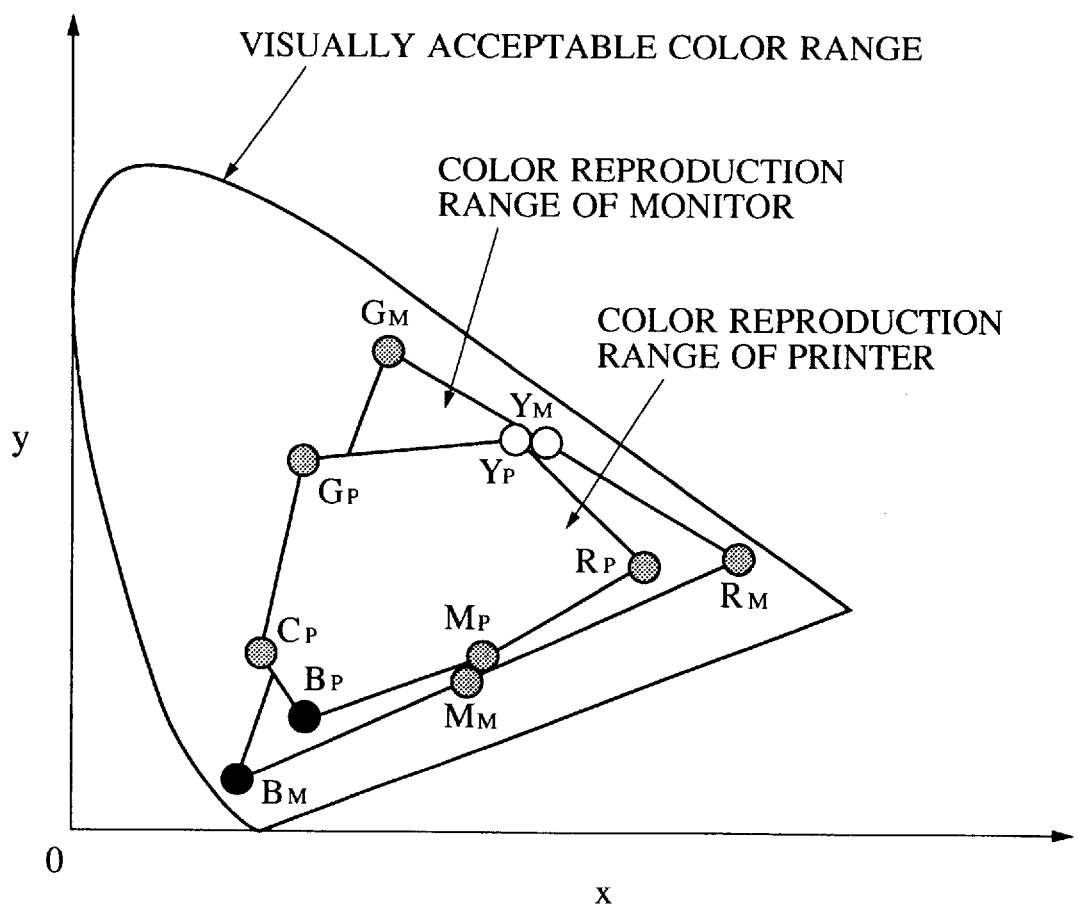
FIG. 5 illustrates an example of a difference in the color reproduction range between a monitor and a printer.

FIG. 3 is a flow chart of CMM processing. As illustrated in FIG. 5, since the color reproduction range of a printer is smaller than that of a monitor, there are some colors which may be displayed on the monitor but cannot be output from the printer. In view of this background, the CMM processing unit 260 performs mapping on the $R_1G_1B_1$ image data within the color reproduction range of the printer so that the color shades produced by the image data can be reproduced as much as possible.

The CMM processing is executed by the following procedure. The profile of the input/output device (the scanner 110 or the monitor 120 and the printer 130) is first detected in the ROM 271 (S11). This profile is concerned with information on the input/output characteristics of the output device, such as the color reproduction range and the like, and stores the information used in the below-described respective steps. Then, the $R_1G_1B_1$ image data is transformed, based on the profile information of the source device, into the $L^*_1a^*_1b^*_1$ image data on the uniform-color space (S12). Subsequently, the $L^*_1a^*_1b^*_1$ image data is subjected to color-space compression processing based on the look-up table (LUT) stored in the profile of the destination device so that it can be transformed into the $L^*_2a^*_2b^*_2$ image data within the color reproduction range of the printer 130 (S13). The color-space compression processing may be performed according to a method for mapping the data beyond the color reproduction range within the boundary of the color reproduction range or according to a method for uniformly mapping the source image data in order to maintain the image gradations. The color-space transformation, which is equivalent to the inverse transformation of the color-space transformation executed in S12, is performed based on the profile information of the destination device, so that the $L^*_2a^*_2b^*_2$ image data can be transformed into the $R_2G_2B_2$ image data on the RGB color space (S14).

In this manner, the color-space compression processing is executed on the uniform color space, thereby satisfying the corresponding visual characteristics. Namely, color-space compression processing can be implemented while maintaining color shades to a greater level. The LUT used for the color-space compression processing stores the source/destination data concerning the representative points. Thus, when data other than the representative points is input, interpolation processing should be performed by use of the source/destination data indicating a plurality of representative points so as to determine unknown output data corresponding to the input data. It thus takes time to perform color-space compression processing, which requires interpolation processing employing complicated computing operations.

When higher-speed processing is desired by the user, blue-shift processing is executed instead of the color-space compression processing. The blue-shift processing method also offers the advantage of preventing a blue color from becoming purplish. Accordingly, good color reproducibility can be achieved, while processing is performed at a higher speed.

(Modification Example)

Although in the above embodiment the blue-shift processing is performed by transforming RGB into RG'B, transformation from RGB into CMY, or from CMY into CM'Y may be employed. Also, the variable used in this embodiment is a byte type representing the numbers ranging from 0 to 255. This was merely determined considering the execution performance of the computer, and other arithmetic types, such as integer, floating point or the like, may be used depending on the performance of the computer.

Further, the correction coefficient z may be 4, in which case, the equation (4) may be substituted by the following equation:

$$M'=M-MIN(C-K,M)/4$$

The use of 4 as a divisor makes it possible to perform the higher speed operation through a bit shift computation rather than a dividing operation. The divisor is not restricted to 4, but may be $2^n$, such as 2, 8 or the like, and in any case, similar advantages can be obtained. Alternatively, a desired correction coefficient may be set by the user, so that blue-shift processing may be modified according to the user's taste. Namely, a change in the correction coefficient varies the suppression degree of M. Accordingly, any desired blue-color reproduction may be achieved by setting the correction coefficient by the user. This also maintains a good balance between a blue color and other colors.

As will be clearly understood from the foregoing description, through illustration of the above-described embodiment, the present invention offers the following advantages. Good reproducibility of a blue color can be achieved. Further, improved color-processing can be performed to reproduce color suitable for the user's purpose.

In this case, the program codes read from the storage medium realize the functions according to the embodiments, and the storage medium storing the program codes constitutes the invention. Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

input means for inputting image data;

setting means for setting a desired color processing mode selected from a plurality of color processing modes; and color processing means for executing color processing according to the color processing mode set by said setting means, wherein the plurality of color processing modes include a first color-processing mode in which color-space compression processing is performed, and a second color-processing mode in which the color-space processing mode is not performed, the second color-processing mode comprising blue-shift processing for reproducing a blue color based on characteristics of a recording material used in an image output device.

2. An image processing apparatus according to claim 1, wherein the blue-shift processing is executed in which color corrections are performed to decrease an amount of magenta used for image formation and to provide gradations in a color zone to be formed by a recording material corresponding to cyan.

3. An image processing apparatus according to claim 2, wherein higher-speed processing is executed in the second color-processing mode than in the first color-processing mode.

4. An image processing apparatus according to claim 1, wherein the first color-processing mode performs the color-space compression processing, while referring to a table, and the second color-processing mode performs the blue-shift processing through computing operations.

5. An image processing apparatus comprising:
  input means for inputting image data;
  color correction means for performing color correction to the image data with use of color correction parameters;
  masking means for performing a masking process in accordance with recording materials; and
  output means for outputting the image data subjected to the color correction and masking process to the image forming means that forms an image by use of recording materials corresponding to a plurality of colors including magenta and cyan,
  wherein said color correction means decreases an amount of magenta used for image formation and also uses the color correction parameters such that elimination of gradations in a color zone to be formed by the recording material corresponding to cyan is suppressed.

6. An image processing apparatus according to claim 5, wherein the color correction parameters comprise matrix coefficients.

7. An image processing apparatus according to claim 5, wherein said color correction means comprises logarithm transformation means for performing luminance-to-density conversion.

8. An image processing method comprising the steps of:
  inputting image data;
  setting a desired color processing mode selected from a plurality of color processing modes; and
  performing color processing according to the color processing mode set in said setting step,
  wherein the plurality of color processing modes include a first color-processing mode in which color-space compression processing is performed and a second color-processing mode in which the color-space compression processing is not performed, the second color-processing mode performing blue-shift processing to reproduce a blue color based on characteristics of a recording material used in an image output device.

9. An image processing method comprising the steps of:
  inputting image data;
  performing color correction on the image data with use of color correction parameters;
  performing a masking process in accordance with recording materials; and
  outputting the image data subjected to the color correction and masking process to image forming means that forms an image by use of recording materials corresponding to a plurality of colors including magenta and cyan,
  wherein said color correction step decreases an amount of magenta used for image formation and uses the color correction parameters such that elimination of gradations in a color zone to be formed by the recording material corresponding to cyan is suppressed.

* * * * *

UNITED STATES PATENT AND TRADEMARK OFFICE
CERTIFICATE OF CORRECTION

PATENT NO. : 5,828,816
DATED : October 27, 1998
INVENTOR(S) : TAKASHI KISE ET AL.

It is certified that error appears in the above-identified patent and that said Letters Patent is hereby corrected as shown below:

COLUMN 2

Line 7, "flow chart" should read --flowchart--.
Line 9, "flow chart" should read --flowchart--.

COLUMN 4

Line 11, "flow chart" should read --flowchart--.
Line 55, "flow chart" should read --flowchart--.

COLUMN 6

Line 58, "include" should read --includes--.

COLUMN 8

Line 7, "include" should read --includes--.

Signed and Sealed this

Third Day of August, 1999

*Attest:*

Q. TODD DICKINSON

*Attesting Officer*     *Acting Commissioner of Patents and Trademarks*